March 6, 1934.  A. C. FOULK  1,949,414
LANDING TUTOR
Filed April 6, 1931
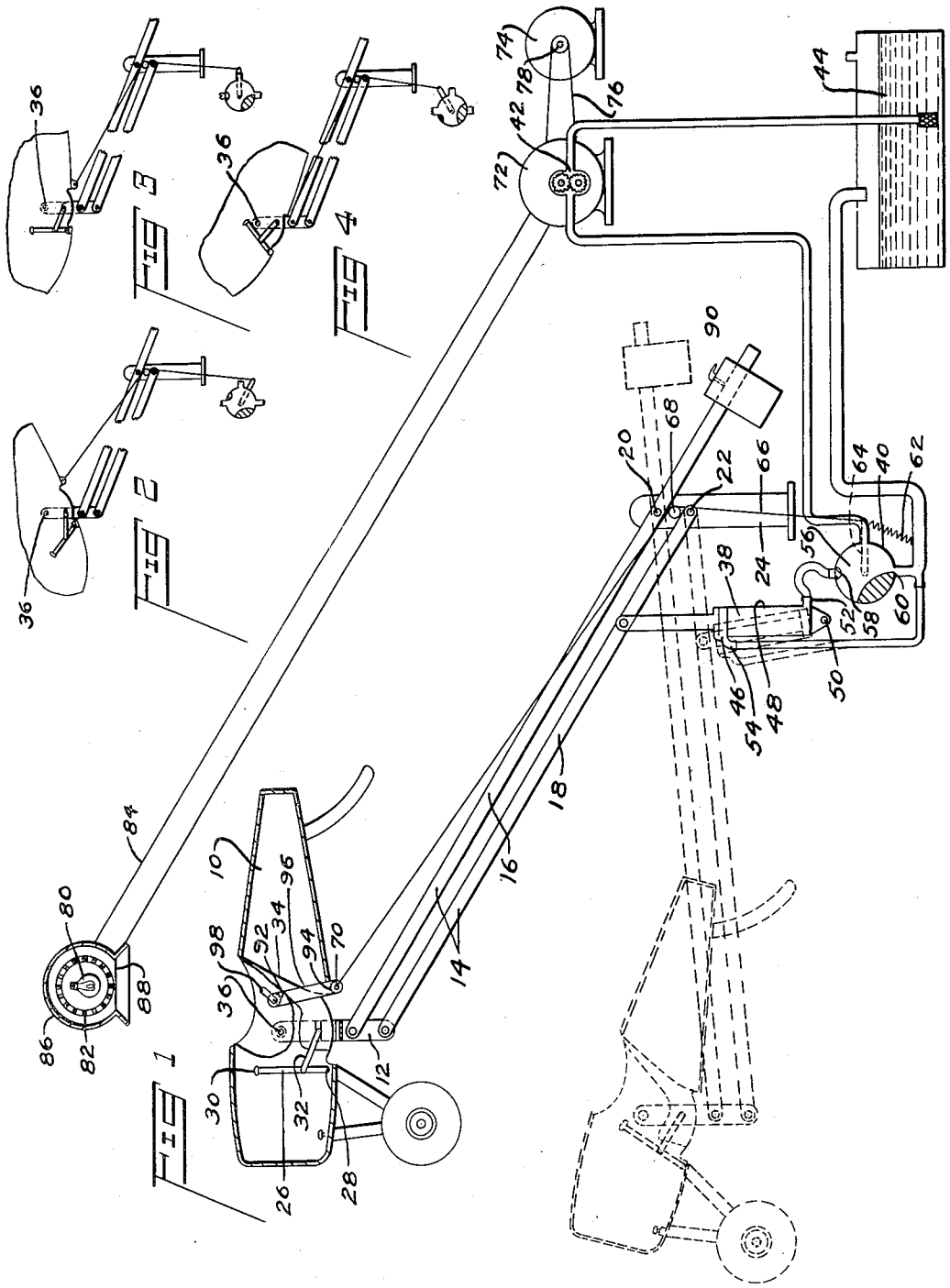
INVENTOR
ALBERT C. FOULK.
BY Robert H. Young
ATTORNEY Patented Mar. 6, 1934

1,949,414

UNITED STATES PATENT OFFICE 1,949,414

LANDING TUTOR

Albert C. Foulk, Dayton, Ohio

Application April 6, 1931, Serial No. 528,075

9 Claims. (Cl. 35—12)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to apparatus for teaching the art of flying in an airplane, more particularly to that phase of flying which involves the landing take-off of airplanes. Obviously this invention is also applicable for amusement purposes.

The object of the present invention is to provide an apparatus which will enable the student pilot to accustom himself to the conditions which prevail during the landing or take-off period of an airplane and to master the means for effecting such maneuvers without having recourse to the actual flying machine.

A further object of my invention is to provide an apparatus capable when correctly manipulated to simulate the descent and landing of an actual airplane in flight, as well as to provide means for creating an illusion of passing scenery, simulating the passing scenery during landing or actual flight.

A further object of my invention is to provide in an apparatus of this character power lift means.

The apparatus as illustrated in the drawing, consists essentially of a support for a person that is so mounted with respect to a fixed standard or fixed reference as it will be hereinafter referred to as to be capable of movement bodily and angularly relative thereto, the angular movement being effected through suitable control means at the will of the pilot and the bodily movement being effected through suitable power means as a result of the angular movement of the support.

In using this apparatus for the purpose of teaching a student pilot the art of landing an airplane, means is provided to accomplish the descent of the support from its elevated position in a manner similar to the descent of an actual airplane as when the motor is shut off or idling; to this end the power for lifting the support is caused to gradually lessen or be transmitted in amounts ranging from maximum to zero. Consequently the support which is more or less dependent for its elevation upon the power means will gradually descend as the power decreases. Thus, it will be obvious that if this descent can be retarded by an angular movement of the support corresponding to an increase in the angle of attack of an airplane and accelerated by an angular movement thereof corresponding to a decrease in the angle of attack of an airplane, and if these changes are made through a control stick operable as in an airplane, the landing of an airplane can be most accurately imitated by this apparatus.

In order to render my invention quite clear I have illustrated an embodiment of the same, by way of example, in the accompanying drawing which forms a part of this application, and in which:

Fig. 1 is an elevational schematic view of the apparatus, showing also the landing position of the cockpit and of parts of the elevating means in dotted outline; and Figs. 2, 3 and 4 are fractional elevational diagrammatic views showing the cockpit elevated and disposed in different angular positions and also the corresponding respective positions of the manual control stick and regulating valve.

Referring more particularly to the apparatus as shown in Fig. 1 of the drawing, 10 designates the cockpit or fuselage having conventional landing gear and tail skid pivotally suspended from its sides at substantially its center of gravity by means of a stirrup 12 that is connected at its lower end to one end of a large counterweight lever arm 14, which can oscillate around a horizontal axis and thus enables the cockpit to rise from, or descend to, the ground. This movement is preferably effected by the control of suitable fluid pressure power means hereinafter described.

The lever 14 is preferably constructed of two levers 16 and 18 forming a parallelogram so that the movement of the stirrup 12, which is the support of the cockpit, is parallel to itself. The levers 16 and 18 pivot about the axes 20 and 22 respectively on the standard or fixed reference 24.

Means is provided whereby the pilot can raise or lower the cockpit as in an airplane by an appropriate inclination of a control stick 26, one end 28 of which is pivotally attached to the fuselage in front of the stirrup, the other end 30 being free for manual manipulation about said pivot. The control stick 26 and stirrup 12 are pivotally interconnected by means of a link 32 that has a portion thereof passing under the front portion of the seat 34, the bottom of the fuselage or cockpit being cut away immediately in front and rearward of the stirrup 12 to such an extent as to allow its inclination to the desired maximum angle upward or downward relative to the horizontal. As will be obvious from an inspection of Fig. 2, pushing of the control stick forward from its normal position as shown in Fig. 3, will cause the cockpit to tilt downward about the pivot 36, whereas pulling of the control stick backward from its normal position will cause the cockpit to tilt upward, as shown in Fig. 4.

Appropriate means, such as an hydraulic system shown in Fig. 1, is provided for acting against the gravitation pull on the cockpit when the cockpit is in an elevated position ready to descend and also to lift the cockpit when taking off from the ground. This system is manually regulated and, as illustrated, consists of an hydraulic lift 38, a manually controlled valve 40 for controlling the fluid pressure to the lift, a pump mechanism 42 and a source of supply 44. The hydraulic lift is provided with a piston 46 operable within a cylinder 48, that is pivotally connected at one end only to a fixed support (not shown) and is pivotally connected to the lever 18 intermediate the ends thereof.

The cylinder 48 of the hydraulic lift is provided with inlet and outlet openings 52 and 54 respectively, that are in communication through suitable tubing with the valve mechanism which regulates the supply of fluid pressure from the source of supply 44. To permit unrestrained pivotal movement of the lift 38 about the axis 50, suitable flexible tubing is provided where necessary.

Fluid is pumped from the source of supply to the valve mechanism by means of a conventional gear pump 42 and is regulated by means of a two-way valve 56 in the valve mechanism for supplying fluid to the lift. When valve opening 58 is closed, the by-pass opening 60 is open and the two-way valve member is so arranged that as the one opens the other closes. Manual control of this valve is effected by means of a cable working against the tension of a spring 62, which is connected to one end of a crank arm 64 (shown in dotted outline in Fig. 1), the other end of said arm having preferably one end of a cable 66 attached for controlling the valve 56. The cable 66 passes over a pulley 68 mounted on the standard 24 and is connected to a spool 70 supported on brackets (not shown) that are fixed to the bottom of the fuselage. The spool is rotatably adjustable by means hereinafter described for varying at will the normal position of valve 56.

The gear pump 42 is driven by suitable means capable of storing and giving off energy and, as diagrammatically illustrated, a fly-wheel 72 is connected to the gear pump 42, and may have power applied thereto by means of a motor 74, the motor and fly-wheel being operatively connected together by means of an endless belt 76, a pulley 78 on the motor shaft and a pulley (not shown) fixed to the fly-wheel.

A light 80 is installed over the fuselage within a cylindrical, perforated screen 82, that is revolved by means of the flywheel through an endless belt 84 passing over the fly-wheel pulley, above referred to, and a pulley (not shown) fixed to the screen. The light is restricted to a downward direction by means of a shade 86 provided with a truncated conelike opening 88 at the bottom thereof.

*Operation.*—With the operator sitting in the fuselage, the weight 90 slidably connected to the lever 16 is shifted to a position where the fuselage and pilot slightly overbalance the weight. The fuselage is held in high position by attendant until landing operation is begun. Power is applied to the fly-wheel. When the predetermined speed is reached, the power is cut off and the fly-wheel allowed to coast. The operator tilts the fuselage forward by means of control stick. The tilting forward of the fuselage operates the valve so as to prevent fluid from entering lift. The fuselage descends under its own weight until stick is pulled back. Tilting the fuselage back operates valve to allow fluid to enter lift. The rapidity of ascent is governed by the degree of tilt. A very slight backward tilt allows just sufficient pressure in lift to prevent fuselage from either ascending or descending. The back pressure from the lift slows the flywheel down and, consequently, as the landing operation proceeds the pressure exerted on the piston becomes less and less. Finally, the pressure diminishes sufficiently to permit the fuselage to be tilted back into landing position without resulting in upward movement.

If the fuselage has not been maneuvered to a position near the ground before the energy of the fly-wheel has been exhausted, a rapid descent and a hard landing will result. If a landing is made on the wheels with tail high, a backward tilting will follow which will cause the fuselage to ascend. This will simulate a wheel landing on rough terrain or a failure to level off soon enough.

The revolving screen above throws a blur of shadows along the floor which gives the operator the impression that he is traveling rapidly forward. The speed of the screen is proportional to that of the fly-wheel, so the apparent forward speed of the fuselage diminishes as the landing operation progresses. The fuselage is supported in such a manner as to be somewhat unstable laterally and longitudinally in a horizontal plane. By reversing the control linkage of the valve, the apparatus may also be used for instruction in take-offs.

If the operator desires to practise the art of "taking-off", the normal position of the two-way valve corresponding to the normal position of the control stick for taking off, is such that the port 58 is open and port 60 is closed. This position is readily obtained by reducing the length of the cable 66, which is accomplished by a predetermined angular rotation of the spool 70 through sprocket wheels 92 and 94, a sprocket chain 96 and a crank arm or handle 98. Stops (not shown) may be provided for limiting the rotational movement of the handle. Having adjusted the two-way valve for "taking-off", it will be obvious that the rate of rise of the cockpit will be proportional to the energy being stored in the fly-wheel and dependent upon the position of the control stick or cockpit.

I claim:

1. An apparatus of the class described, comprising a fixed reference a support for a person pivotally mounted on said fixed reference and means associated with said fixed reference for elevating said support relative to the latter, said means being operable from said support to control the attitude of the support relative to said fixed reference in accordance with a source of predetermined variable energy.

2. An apparatus of the class described, comprising a stationary support, a movable support for a person pivotally connected to said stationary support for movement angularly and in a vertical plane relative thereto, and power means cooperating with said stationary support for elevating the support for the person, said means being controllable from said movable support and in accordance with a source of predetermined gradually variable energy.

3. An apparatus of the class described, comprising a stationary support, an arm pivotally connected to said support at one end, a cockpit pivotally connected to the other end of said arm, power means for moving said arm and means controllable from said cockpit for regulating said power means to alter the speed and for controlling the attitudes of said cockpit.

4. An apparatus of the class described, comprising a stationary support, an arm pivotally connected to said support at one end, a cockpit pivotally connected to the other end of said arm, power means for moving said arm and means controllable from said cockpit for moving said cockpit relative to said arm and for regulating the power means to vary the speed of movement of said arm in proportion to the angular relationship of said cockpit and said arm.

5. A system for teaching the art of flying in an airplane, comprising a source of energy, power means for storing and transmitting said energy, a pivotally mounted support for a person movable relative to a fixed reference, means adapted to be actuated by said first-mentioned means for moving said support, and means controllable from said support for changing at will the attitude of said support and for regulating said power means.

6. A system for teaching the art of flying in an airplane, comprising a source of energy, means for storing and transmitting said energy, a pivotally mounted support for a person movable bodily and angularly relative to a fixed reference and means adapted to be actuated by said first-mentioned means for bodily moving said support, manual controls for tilting said support, and means interconnecting said support and said first-mentioned means for controlling the latter and thereby change at will the attitude of said support for the person.

7. A system for teaching the art of flying in an airplane, comprising a source of energy of predetermined amount, a pivotally mounted support for a person movable relative to a fixed reference, means adapted to be actuated by said source of energy for moving said support, and further means operable by said source of energy for creating the illusion of passing scenery.

8. A system for teaching the art of flying in an airplane, comprising a source of energy, means for storing and transmitting said energy, a pivotally mounted support for a person movable relative to a fixed reference, and fluid pressure means adapted to be actuated by said first-mentioned means for moving said support, said last-mentioned means comprising a valve and means operable from said support for controlling said valve to regulate the fluid pressure.

9. A system for teaching the art of flying in an airplane, comprising a source of energy, means for storing and transmitting said energy, a pivotally mounted support for a person movable relative to a fixed reference, fluid pressure means adapted to be actuated by said first-mentioned means for moving said support, said last-mentioned means comprising a valve and means operable from said support for controlling said valve to regulate the fluid pressure, and further means for adjusting said valve for effecting a change in its setting from a landing to a take-off or vice versa.

ALBERT C. FOULK.